United States Patent [19]
Lindonen et al.

[11] 4,022,523
[45] May 10, 1977

[54] ADJUSTABLE FOCAL LENGTH CYLINDRICAL MIRROR ASSEMBLY

[75] Inventors: Laurie R. Lindonen; Curtis P. VanVloten, both of Cambridge, Mass.

[73] Assignee: Arthur D. Little, Inc., Cambridge, Mass.

[22] Filed: Jan. 26, 1976

[21] Appl. No.: 652,131

[52] U.S. Cl. .............................................. 350/295
[51] Int. Cl.² ........................................... G02B 5/10
[58] Field of Search ................... 350/293, 295, 296

[56] References Cited
UNITED STATES PATENTS

| | | |
|---|---|---|
| 840,084 | 1/1907 | Müller .................................. 350/295 |
| 2,129,513 | 9/1938 | Wegener ............................. 350/295 |
| 2,579,225 | 12/1951 | Borst et al. ........................ 350/295 |
| 2,653,249 | 9/1953 | Harker ............................ 350/295 X |
| 2,707,903 | 5/1955 | Trombe ......................... 350/295 X |

*Primary Examiner*—John K. Corbin
*Assistant Examiner*—F. L. Evans
*Attorney, Agent, or Firm*—Bessie A. Lepper

[57] ABSTRACT

An optical assembly which provides a cylindrical mirror of adjustable focal length, adjustable angle of elevation, adjustable horizontal orientation and adjustable angle of focus. The mirror is formed of a thin member of a spring material and it is mounted on a four-point support system comprising sets of inner and outer loading points. Means are provided to move one set of loading points relative to the other set to control and adjust the radius of curvature and hence the focal length of the mirror. Means are also provided to tilt the mirror, to orient it in a horizontal plane and to orient the line beam it forms to control the angle of focus.

17 Claims, 5 Drawing Figures

U.S. Patent  May 10, 1977  4,022,523
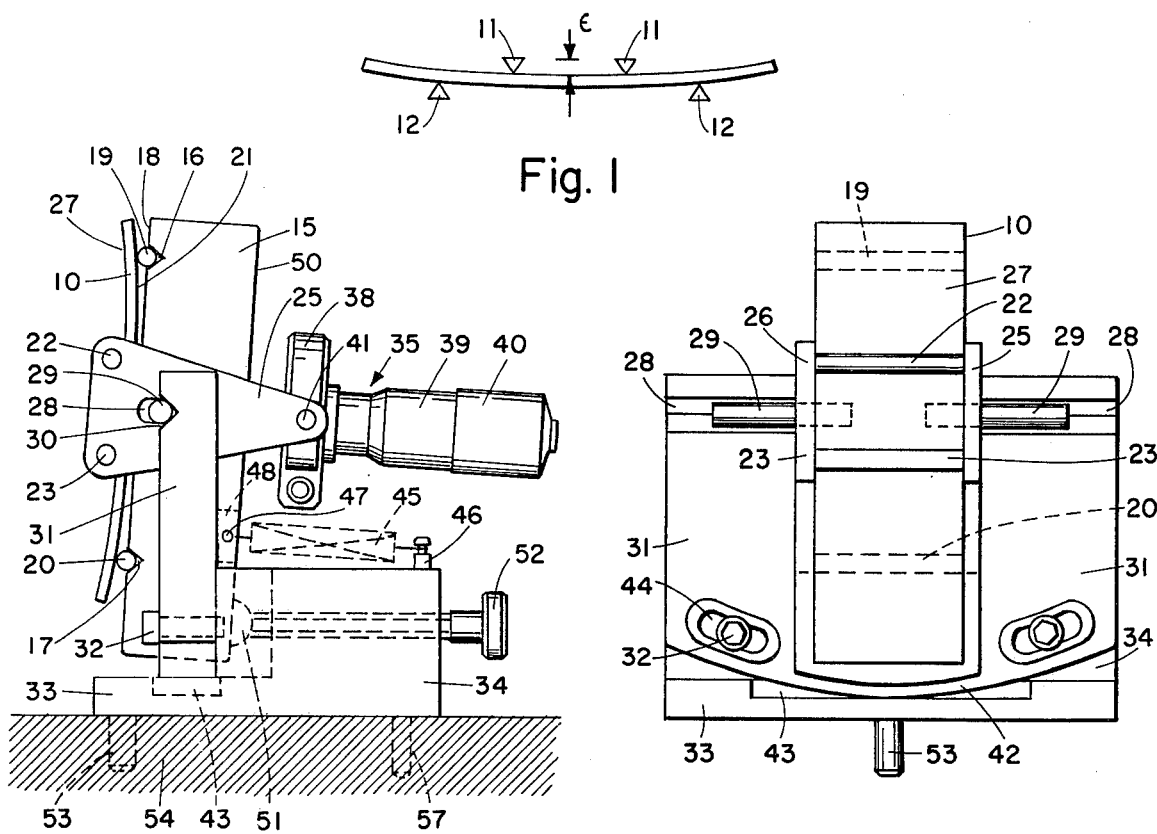
Fig. 1
Fig. 2
Fig. 3
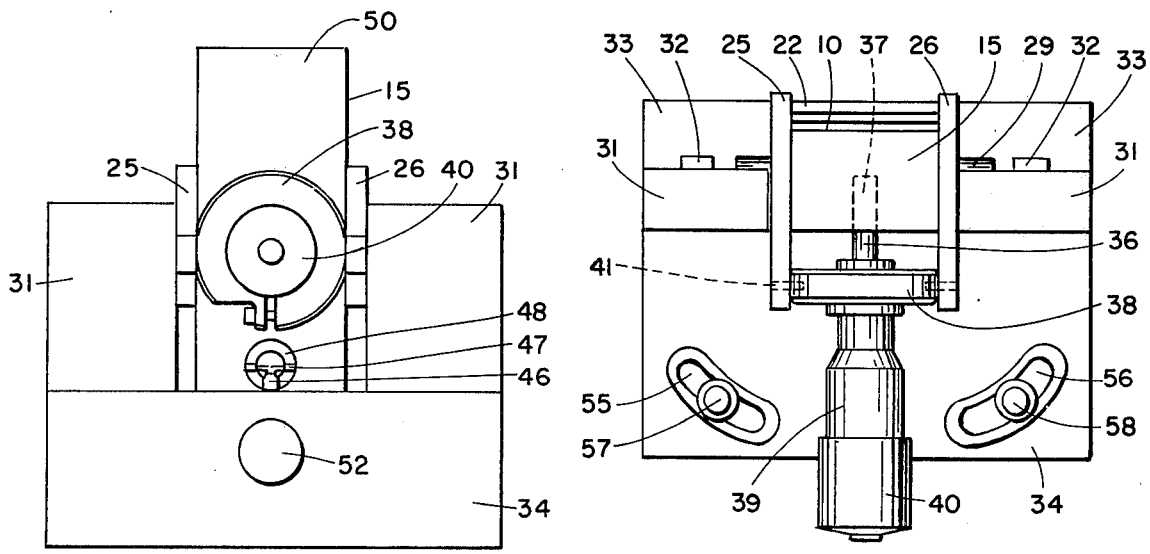
Fig. 4
Fig. 5

ADJUSTABLE FOCAL LENGTH CYLINDRICAL MIRROR ASSEMBLY

This invention relates to an optical tool and more particularly to an adjustable focal length cylindrical mirror assembly.

Cylindrical mirrors as optical components are, of course, known and have several well-established uses in optical systems. Exemplary of such uses is the focusing of a half-annular energy beam into a line beam, that is a beam which approaches a line in configuration and has a very high aspect (length-to-width) ratio.

Generally such cylindrical mirrors are so constructed as to have a completely rigid configuration which, in turn, means that they have a fixed focal length. This in turn makes it necessary to reposition such fixed focal length mirrors relative to their focal length in making adjustments to compensate for any shift in relative position between the mirror and the surface onto which the beam is focused. The inability to readily make such adjustments means that it essentially prohibits making continuously controlled adjustments throughout any prolonged use of apparatus incorporating one or more fixed focal length cylindrical mirror in its optical system.

As an example of the need for cylindrical mirrors with adjustable and easily controllable focal lengths we may cite the use of such mirrors in the apparatus for forming refractory tubings which is described in U.S. Ser. No. 318,911 filed Dec. 27, 1972, now U.S. Pat. No. 3,943,324 and assigned to the same assignee as the present application. In this apparatus it is desirable to provide a plurality of beams of radiant energy, e.g., from a laser, which have very high aspect ratios that a molten ring of a predetermined controlled height may be formed in the tubing and the energy distribution within the ring maintained essentially uniform. The provision of an adjustable focal length cylindrical mirror is particularly desirable in such apparatus to achieve controlled continuous adjustments.

It is therefore a primary object of this invention to provide an improved adjustable focal length cylindrical mirror assembly. It is another object to provide a cylindrical mirror assembly of the character described which is suitable for incorporation in an optical system designed to create a heating zone of predetermined height, width and energy distribution. An additional object of this invention is to provide a cylindrical mirror assembly the focal length of the mirror of which is readily adjustable during use without disruption of the energy beam being directed by it. Yet another object is to provide such an assembly which provides for accurate adjustment and control of the angle of elevation, the orientation of the mirror in the horizontal plane and the control of the angle focus. Other objects of the invention will in part be obvious and will in part be apparent hereinafter.

According to this invention there is provided an adjustable focal length cylindrical mirror assembly which comprises a spring mirror having an optically reflective front surface and a back surface, a set of two inner loading point means for contacting the front surface of the mirror, a set of two outer loading point means spaced from and outside said inner loading point means contacting the back surface of the mirror and means to controllably move one set of loading means with respect to the other set thereby to impart a variable radius of curvature to the mirror and to form a cylindrical mirror, the focal length of which is adjusted and controlled through the movement of the movable set of loading means. The assembly is constructed so that the angle of elevation of the mirror may be adjusted. Moreover, the mirror may be moved to adjust its orientation in the horizontal direction and to adjust the orientation of the line beam formed and hence to control the angle of focus of the beam.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 1 is a schematic drawing of the mechanism employed in the mirror assembly of this invention to attain a variable focal length of a cylindrical mirror;

FIG. 2 is a side elevational view of the adjustable focal length cylindrical mirror assembly of this invention;

FIG. 3 is a front elevational view of the mirror assembly of FIG. 2;

FIG. 4 is a back elevational view of the mirror assembly of FIG. 2; and

FIG. 5 is a top plan view of the mirror assembly of FIG. 2.

In the mirror assembly of this invention, as shown schematically in FIG. 1, a cylindrical mirror 10 is formed by bending a strip or sheet-like member of a reflective material about a variable radius of curvature. In order to vary the radius of curvature, this mirror strip is held fixed between a set of two inner loading points 11 and a set of two outer loading points 12, one set of loading points being held fixed while the other set is movable. In the embodiment of the mirror assembly shown in FIG. 2–5, the set of outer loading points is movable. The radius of curvature between the set of the two inner loading points of the four-point system thus created is uniform and the focal length of the cylindrical mirror thus formed is identical to one-half the radius of curvature of the mirror. This radius of curvature is uniquely defined by the deflection $\epsilon$; and the mechanism of the mirror assembly of this invention provides a means to vary the deflection $\epsilon$ and hence to adjust the focal length of the mirror.

The mirror assembly of this invention is shown in side, front and back elevational and top plan views in FIGS. 2–5, and reference should be had to all of these drawings, in which the same reference numerals are used to identify the same components, in the following detailed description.

The mirror assembly of this invention, in addition to providing means to adjust the radius of curvature and hence the focal length of the mirror, also provides means to adjust the angle of elevation of the mirror, means to adjust its orientation in the horizontal plane in which it is mounted and means to adjust and control the orientation of the line beam formed and hence the angle of focus.

Mirror 10 may, for example, be formed from 1/16 inch thick spring berylium-copper which is then gold plated and optically polished to form its reflective surface. It is, however, possible to form mirror 10 from any other suitable spring material (metal or nonmetal).

The mirror may also, in accordance with well established optical practice, be of the front- or back-reflection type. In the following description, as well as in the claims, the reflective surface of the mirror is considered to be its front face or surface, whether or not it is of the front- or back-reflective type; and the opposite nonreflecting surface is considered to be the back side or surface of the mirror.

The four-point support system and means for varying the deflection $\epsilon$ to vary the focal length of mirror 10 includes a mirror mounting block 15, having an upper groove 16 and lower groove 17 cut in its front face 18, and parallel mirror support rods 19 and 20 seated within grooves 16 and 17 and having diameters of sufficient magnitude so that the rods 19 and 20 extend beyond grooves 16 and 17 such that the back side 21 of mirror 10 makes contact with rods 19 and 20. These rods 19 and 20 thereby provide the required set of two outer loading points. Two parallel rods 22 and 23 equally spaced from rods 19 and 20 are mounted in the base side of parallel triangularly-shaped yokes 25 and 26. These rods 22 and 23 are positioned to contact the reflective surface 27 of mirror 10 and serve as the set of two inner loading points. As will be seen in FIG. 2 for yoke 25, each yoke has an axially positioned slot 28 adapted to engage oppositely disposed block support rods 29 mounted in holes drilled on opposite sides of mounting block 15 as shown in FIG. 3. Slots 28 are so sized and positioned that the block support rods 29 can slide back and forth therein thereby to permit block 15 to be moved toward and back from mirror 10, thus causing rods 19 and 20 to decrease or increase the radius of curvature as they are forced against back surface 21 of the mirror. Rods 29 are seated in slots 30 of two opposed parallel upright supports 31 which are attached through screws 32 to a stepped-shaped base member comprising a lower section 33 and a higher section 34. The supports 31 are arcuately configured along their bottom edges and are joined through an arcuately shaped yoke 42 which extends into a recess 43 cut in lower section 33 of the base member. Oppositely disposed arcuate slots 44 with inner ridges are cut through upright supports 31 to permit the imparting of what may be termed a "twisting" of the supports 31 and hence of mirror 10 and likewise of its focal axis. When screws 32, which engage the front wall of base section 34 are loosened, the yoked upright supports 31 may be moved through an arc into the position required to achieve a desired orientation of the line beam before the screws are tightened to fix the mirror position in this adjustment mode. In this manner, it is possible to adjust and control the angle of focus of the cylindrical mirror.

The desired adjustment motion of mounting block 15 is achieved through the use of a vernier assembly 35 comprising a rod 36, which fits into a well 37 drilled in the back of block 15, in force applying relationship to block 15 (see FIG. 5), a mounting ring 38, a calibrated vernier section 39 and a hand-operated knob 40. The vernier assembly 35 is mounted to yoke 25 through oppositely-disposed pins 41.

Rods 29 of mounting block 15 are continuously kept seated in grooves 30 and contact between mounting block 15 and vernier rod 36 is continuously maintained through spring 45 which is affixed at one end to a post 46 mounted on base member section 34 and at the other end to a rod 47 extending across a well 48 cut in the back of mounting block 15. It will therefore be apparent that the turning of knob 40 in a direction to move rod 36 toward mirror 10 moves block 15 and hence outer support rods 19 and 20; while turning knob 40 in the opposite direction allows block 15 to be pulled backward by the action of spring 45. Turning knob 40 thereby moves block 15 and hence outer support rods 19 and 20 in or out depending upon the direction of turning. Thus if knob 40 is turned to force block 15, through the action of rod 36, toward the mirror 10 the radius of curvature, and hence the focal length of the cylindrical mirror formed, decreases. Permitting block 15 to move backwardly away from mirror 10 increases the radius of curvature and hence the focal length of the mirror.

The mirror mounting block 15 is supported through rods 29 in upright support 31 to permit the adjustment of the angle of elevation of the mirror 10 along with block 15 and vernier assembly 35. This adjustment of elevational angle is particularly useful when the mirror assembly is used in laser-heated refractory tubing formation as described in Ser. No. 318,911 or in floating zone processes since it makes it possible to control the height of the beam striking the work piece and thus to control and adjust the height of the heating zone formed.

Mounted at the lower end of the back side 50 of mounting block 15 is a contact ball 51 against which a screw 52, passing through base section 34, bears to adjust the angular position of mounting block 15 (and hence mirror 10) as it pivots on rods 29. Spring 45 serves continuously to maintain the required contact between ball 51 and the end of screw 52. Thus by turning screw 52, the angle of elevation of mirror 10 is adjusted.

Since it is also desirable to be able to move the mirror within the horizontal plane in which it is mounted for another degree of adjustment, base member section 34 has a pivot pin 53 which is inserted in a suitably-sized hole drilled in the foundation 54 on which the mirror assembly rests. In a preferred embodiment of the apparatus of this invention the axis of pivot pin 53 coincides with the nominal position of the reflecting surface of mirror 10 so that the beam of radiant energy does not move on the mirror when this type of adjustment is effected. Base member section 34 has oppositely positioned, arcuately-configured slots 55 and 56 with inner ridges, the surfaces of which are adapted for contact with the heads of screws 57 and 58 such that when screws 57 and 58 are loosened, the entire base member may be pivoted in the horizontal plane defined by the surface of foundation 54 about pivot pin 53; and when the desired mirror position is attained, the screws 56 and 57 are tightened to lock the mirror in place.

In the use of one or more mirror assemblies of this invention the assemblies are located at a desired distance from the work piece, the position in the horizontal plane is determined and fixed by tightening screws 57 and 58, the focal length of the mirror adjusted by turning vernier screw 40, the elevation of the mirror adjusted by turning screw 52, and the orientation of the line beam set by adjusting the position of vertical supports 31 relative to the base support member. The mirror assembly of this invention permits maintaining the alignment of the mirror during such adjustments since the focal length of the mirror during such adjustments since the focal length of the mirror may be adjusted without disturbing any other adjustments previously made; and the energy density and/or size of the heated zone which is created through the use of the mirror assembly can be adjusted during its use.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

We claim:

1. An adjustable focal length cylindrical mirror assembly comprising, in combination
   a. a spring mirror member having an optically reflective front surface and a back surface;
   b. a set of two inner loading point means for contacting said front surface of said mirror member comprising parallel rods between two parallel, spaced yokes;
   c. a set of two outer loading point means spaced from and outside said inner loading point means contacting said back surface of said mirror member and comprising parallel rods mounted in a mounting block and forming with said two inner loading point means a four-point support system; and
   d. means to controllably move one set of said loading point means with respect to the other set thereby to impart a variable radius of curvature to said mirror member and form a cylindrical mirror.

2. An adjustable focal length cylindrical mirror assembly in accordance with claim 1 wherein said means to controllably move said one set of said loading point means comprises means to move said mounting block relative to said set of inner loading point means.

3. An adjustable focal length cylindrical mirror assembly in accordance with claim 2 wherein said means to move said mounting block comprises vernier means including rod means in thrust applying relationship with said mounting block and being mounted between said yokes, and spring means for maintaining contact between said rod means and said mounting block.

4. An adjustable focal length cylindrical mirror assembly in accordance with claim 3 including a base support, parallel upright supports affixed to said base support, and block support rods oppositely disposed on said mounting block and pivotally mounted in said upright supports whereby the axis of said block support rods is the pivot axis of said mounting block.

5. An adjustable focal length cylindrical mirror assembly in accordance with claim 4 including means to pivot said mounting block thereby to adjust the angle of elevation of said mirror member.

6. An adjustable focal length cylindrical mirror in accordance with claim 5 wherein said means to pivot said mounting block comprises screw means extending through a portion of said base support in adjustable thrust applying relationship with the lower end of said mounting block and said spring means serving as means to maintain contact between said screw means and said mounting block.

7. An adjustable focal length cylindrical mirror in accordance with claim 4 including means to adjust the orientation of the beam reflected by said mirror means and to control the angle of focus of said mirror means.

8. An adjustable focal length cylindrical mirror in accordance with claim 7 wherein said upright supports are joined through a yoke which forms with the bottom edges of said upright supports an arcuate configuration and said means to adjust the orientation of said beam comprises arcuate slots in said upright supports and set screws extending through said slots to engage said base support whereby said yoked upright supports may be moved through an arc relative to said base support before being affixed thereto by said set screws.

9. An adjustable focal length cylindrical mirror in accordance with claim 4 including a pivot pin affixed to the front of said base support and oppositely disposed arcuate ridged slots cut in the back of said base support, whereby said base support along with said mirror member may be pivoted around said pivot pin to attain a desired orientation in the horizontal plane in which said assembly is positioned and be affixed at said desired orientation by means of set screws engaging the surfaces of said ridged slots.

10. An adjustable focal length cylindrical mirror in accordance with claim 9 wherein the axis of said pivot pin coincides with the nominal position of said reflective surface of said mirror member.

11. An adjustable focal length cylindrical mirror assembly comprising, in combination;
   a. a mirror mounting block having a front face and a back face and mounting rods attached to each side thereof, said front face having upper and lower notches;
   b. parallel yokes disposed on said sides of said mounting block and being slotted to slidably move on said mounting rods of said mounting block;
   c. outer parallel rods in said notches in said front face of said mounting block;
   d. inner parallel rods mounted in said yokes and extending across said front face of said mounting block;
   e. a spring mirror having a back surface in contact with said outer parallel rods serving as outer loading points for said mirror and a front optically reflective surface in contact with said inner parallel rods serving as inner loading points for said mirror;
   f. a stepped-shaped base member having lower and higher base sections;
   g. mounting block moving means for moving said block toward and away from said mirror whereby said mirror assumes a radius of curvature which determines its focal length;
   h. mounting block upright support means attached to said higher section of said base member for pivotally supporting said mounting block through said mounting rods; and
   i. means to adjust the angle of elevation of said mirror by effecting controlled pivoting of said mounting block.

12. An adjustable focal length cylindrical mirror assembly in accordance with claim 11 wherein said mounting block moving means comprises vernier means including rod means in thrust applying relationship with said mounting block and being mounted between said yokes, and spring means anchored to said base member for maintaining contact between said rod means and said mounting block.

13. An adjustable focal length cylindrical mirror assembly in accordance with claim 12 wherein said means to adjust the angle of elevation of said mirror comprises screw means extending through said higher section of said base member in adjustable thrust applying relationship with the lower end of said mounting block and said spring means serving as means to maintain contact between said screw means and said mounting block.

14. An adjustable focal length cylindrical mirror in accordance with claim 11 including a pivot pin affixed to the front of said lower section of said base member and oppositely disposed arcuate ridged slots cut in the higher section of said base member, whereby said base member along with said mirror member may be pivoted around said pivot pin to attain a desired orientation in the horizontal plane in which said assembly is positioned and be affixed at said desired orientation by means of set screws engaging the surfaces of said ridged slots.

15. An adjustable focal length cylindrical mirror in accordance with claim 14 wherein the axis of said pivot pin coincides with the nominal position of said reflective surface of said mirror.

16. An adjustable focal length cylindrical mirror in accordance with claim 11 including means to adjust the orientation of the beam reflected by said mirror and to control the angle of focus of said mirror.

17. An adjustable focal length cylindrical mirror in accordance with claim 16 wherein said upright support means comprise parallel support members joined through a yoke which forms with the bottom edges of said support members an arcuate configuration and said means to adjust the orientation of said beam comprises arcuate slots in said support members and set screws extending through said slots to engage said base member whereby said yoked support members may be moved through an arc relative to said base member before being affixed thereto by said set screws.

* * * * *